(12) United States Patent
Choi et al.

(10) Patent No.: US 8,658,314 B2
(45) Date of Patent: Feb. 25, 2014

(54) LITHIUM—MANGANESE—TIN OXIDE CATHODE ACTIVE MATERIAL AND LITHIUM SECONDARY CELL USING THE SAME

(71) Applicant: Korea Institute of Science and Technology, Seoul (KR)

(72) Inventors: Ji-Won Choi, Seoul (KR); Seok-Jin Yoon, Seoul (KR); Dong Wook Shin, Cheonan-si (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 13/960,267

(22) Filed: Aug. 6, 2013

(65) Prior Publication Data

US 2013/0316097 A1    Nov. 28, 2013

Related U.S. Application Data

(62) Division of application No. 12/345,082, filed on Dec. 29, 2008.

(30) Foreign Application Priority Data

Mar. 18, 2008  (KR) .................. 10-2008-0025092
Jul. 23, 2008  (KR) .................. 10-2008-0071536

(51) Int. Cl.
    *H01M 4/50*    (2010.01)
    *H01B 1/08*    (2006.01)

(52) U.S. Cl.
    USPC ........................ 429/224; 252/519.1

(58) Field of Classification Search
    USPC ........................ 429/224; 252/519.1
    See application file for complete search history.

(56) References Cited

U.S. PATENT DOCUMENTS

2003/0134200 A1* 7/2003 Tanaka et al. ............. 429/231.1
2008/0048615 A1* 2/2008 Thackeray et al. ........... 320/128

* cited by examiner

*Primary Examiner* — Milton I Cano
*Assistant Examiner* — Brent Thomas
(74) *Attorney, Agent, or Firm* — Ladas & Parry LLP

(57) ABSTRACT

A cathode thin film for a lithium secondary cell, which uses a cathode active material substituting Sn for Mn in lithium manganese oxide, has a high discharge capacity and an improved cycle property.

9 Claims, 8 Drawing Sheets

LITHIUM—MANGANESE—TIN OXIDE CATHODE ACTIVE MATERIAL AND LITHIUM SECONDARY CELL USING THE SAME

CROSS REFERENCE TO RELATED APPLICATIONS

This application is a divisional of U.S. application Ser. No. 12/345,082 filed on Dec. 29, 2008, pending. This application claims priority from Korean patent application No. 10-2008-0025092 filed on Mar. 18, 2008, and Korean patent application No. 10-2008-0071536 filed on Jul. 23, 2008, all of which are incorporated herein by reference intheir entireties for all purposes.

FIELD OF THE INVENTION

The present invention relates to a lithium-manganese-tin oxide cathode active material and a lithium secondary cell using the same.

BACKGROUND OF THE INVENTION

Lithium-manganese oxide ($LiMn_2O_4$) has been extensively studied together with lithium-nickel oxide ($LiNiO_2$) as an alternative to the lithium-cobalt oxide ($LiCoO_2$) which is currently used as a cathode active material of a lithium secondary cell, for the reason that the lithium-cobalt oxide is expensive and suffers from environmental problems. Also, the use of the lithium-cobalt oxide and lithium-nickel oxide is hampered by the danger of explosion due to the oxygen generated when overcharged, but a lithium-manganese oxide does not generate oxygen even when overcharged and has a cost-merit due to the use of less expensive Mn.

However, $LiMn_2O_4$ has a lower theoretical charge capacity (148 mAh/g) than the lithium-cobalt oxide (274 mAh/g), and as the charge/discharge cycle is repeated, its discharge capacity rapidly decreases. Such poor cycle property results from the transition from the original cubic phase to a tetragonal phase due to the generation of $Li_2Mn_2O_4$ on the cathode as lithium ions are intercalated during charge/discharge cycles [W. Liu el al., J. Electronchem. Soc., 1996, Vol. 143, No. 11, pp. 3590-3596; R. J. Gummow et al., Solid State Ionics, 1994, Vol. 69, pp. 59-67]. As lithium ions are intercalated, the valence of Mn becomes smaller than 3.5 or less and a strong Jahn-Teller distortion occurs, transforming the cubic crystalline phase to a tetragonal phase with which intercalation/deintercalation of lithium ions becomes more difficult [G. Pistoia et al., Solid State Ionics, 1995, Vol. 78, pp. 15-122]. In other words, the arrangement of Mn(III) ($t^3_{2g} \cdot e^1_g$, high spin) in a spinel structure changes and the octahedron becomes severely elongated and the c/a ratio increases by 16% per unit cell, causing destabilization of the cathode structure and the poor charge/discharge cycle characteristic. Furthermore, as the valence of Mn($3d^4$) in $LiMn_2O_4$ reverts back to 3.5 during the lithium deintercalation, the discharge becomes more difficult, and the charge/discharge capacity decreases rapidly.

SUMMARY OF THE INVENTION

Accordingly, it is an object of the present invention to provide a novel lithium-manganese-tin oxide cathode active material for a lithium secondary cell, having an improved charge/discharge property.

In accordance with one aspect of the present invention, there is provided a cathode active material, comprising a lithium-manganese-tin oxide of formula (I):

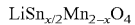  (I)

(wherein, $0 < x \le 0.05$)

In accordance with another aspect of the present invention, there is provided a lithium secondary cell, comprising the lithium-manganese-tin oxide of formula (I) as a cathode active material.

In the cathode active material of the present invention, a small amount of Sn substitutes for Mn in $LiMn_2O_4$ to make it possible to maintain the valence of Mn at 3.5 or more and to suppress Jahn-Teller distortion. Thus, the phase transition is prevented so as to increase the charge/discharge capacity. Therefore, a lithium secondary cell of the present invention has a higher charge/discharge capacity and a longer use life as compared with a pure $LiMn_2O_4$ cathode thin film. Further, the capacity and the cycle property of the inventive cathode active material are excellent even under a high current density, which allows a microelectronic device to have a high efficiency and power density.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1A:
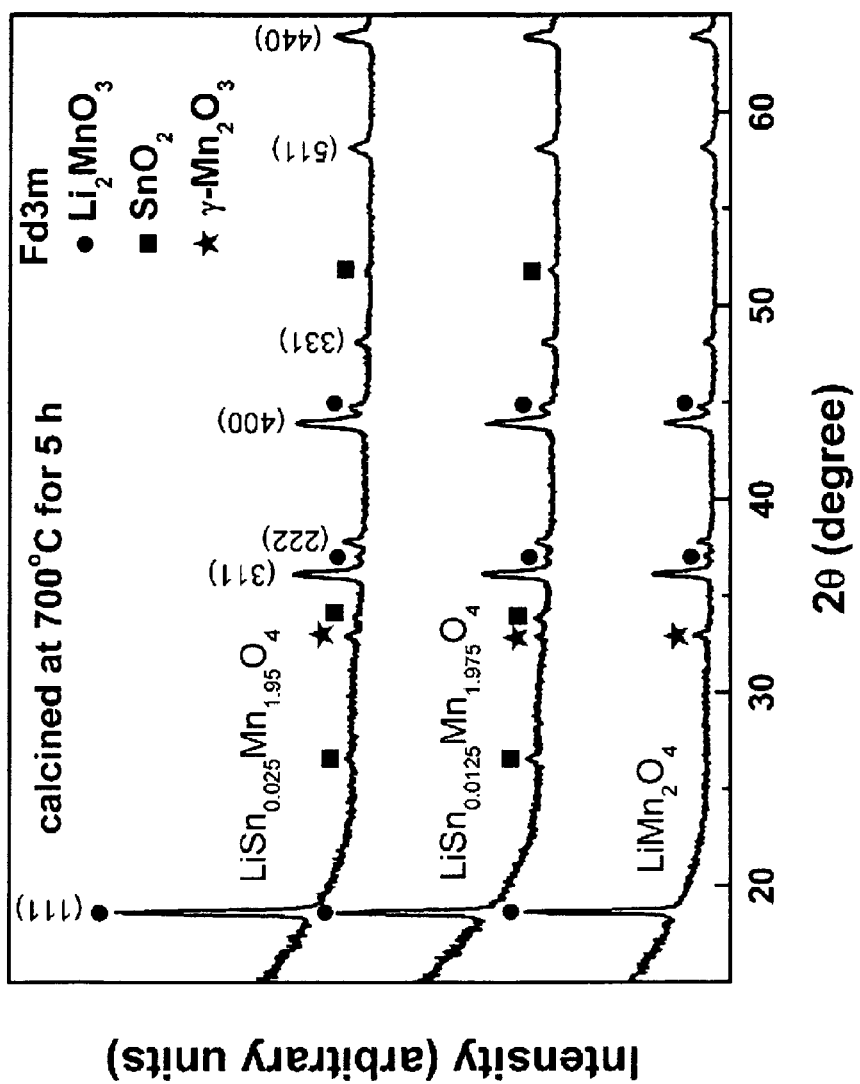
FIG. 1a: XRD patterns of the calcined powders prepared in Comparative Example 1 and Examples 1 and 2.

A cathode active material of the present invention comprises a lithium-manganese-tin oxide of $LiSn_{x/2}Mn_{2-x}O_4$ ($0 < x \le 0.05$), whose density is preferably 3.4 to 4.4 g/cm$^3$.

A preparation method thereof comprises the steps of: a) mixing powders of Li, Mn and Sn compounds to obtain a mixed powder; b) first-milling the mixed powder; c) calcining the first-milled powder; d) second-milling the calcined powder; e) pressing the second-milled powder; and f) sintering the pressed mixture.

In the preparation method, the Li compound is preferably selected from the group consisting of $Li_2CO_3$, LiOH, $CH_3COCH=C(OLi)CH_3$, $LiOOCCH_3$, $LiOOCCH_3 \cdot 2H_2O$, LiCl, $LiCl \cdot xH_2O$ ($0.005 < x < 1$), $LiO_2CCH_2C(OH)(CO_2Li)(CH_2CO_2Li \cdot xH_2O$ ($1 < x < 6$), $Li_2S$, $Li_2SO_4 \cdot H_2O$, and a mixture thereof. The Mn compound is preferably selected from the group consisting of $MnO_2$, $(CH_3CO_2)_2Mn$, $(CH_3COO)_2Mn \cdot 4H_2O$, $(CH_3COO)_2Mn \cdot 2H_2O$, $[CH_3COCH=C(O)CH_3]_2Mn$, $Mn(C_5H_7O_2)_3$, $MnCO_3$, $MnCl_2$, $MnCl_2 \cdot xH_2O$ (1<x<5), [C$_6$H$_{11}$(CH$_2$)$_3$CO$_2$]$_2$Mn, MnF$_2$, Mn(NO$_3$)$_2$, Mn$_3$O$_4$, MnO, Mn$_2$O$_3$, Mn(ClO$_4$)$_2$·6H$_2$O, MnSO$_4$·xH$_2$O (1<x<6), MnS, and a mixture thereof. The Sn compound is preferably selected from the group consisting of SnO, Sn(CH$_3$CO$_2$)$_2$, SnCl$_2$, SnCl$_2$·2H$_2$O, [CH$_3$(CH$_2$)$_3$CH(C$_2$H$_5$)CO$_2$]$_2$Sn, SnF$_2$, SnC$_2$O$_4$, SnSO$_4$, SnS, and a mixture thereof.

In the preparation method, the amounts of the Li, Mn and Sn compounds used in step a) are preferably 18.0 to 26.0 wt%, 72.4 to 81.9 wt% and 0.1 to 1.6 wt%, respectively, based on the total weight of the mixed powder. Preferably, the calcination process in step c) is conducted at 400 to 800° C. for 1 to 5 hours under an ambient condition, the second-milled powder is pressed in step e) to form a pellet, and the sintering process in step f) is conducted at 800 to 1,300° C. for 1 to 24 hours under an ambient condition.

A lithium secondary cell of the present invention comprises a lithium-manganese-tin oxide of LiSn$_{x/2}$Mn$_{2-x}$O$_4$ (0<x<0.05) as a cathode active material.

Preferably, the lithium secondary cell comprises a cathode thin film obtained by depositing the lithium-manganese-tin oxide on a substrate using an LCVD (laser-assisted chemical vapor deposition) process using the lithium-manganese-tin oxide compound as the target. The LCVD process is preferably conducted at a substrate temperature of 350 to 550° C., while maintaining the distance between the substrate and the target at 3 to 5 cm, the oxygen partial pressure at 0.05 to 0.25 Torr, a laser power density of 1 to 4 J/cm$^2$, a beam area of 2 to 5 mm$^2$, and a spot repetition of 3 to 10 Hz, for 30 to 120 minutes.

EXAMPLES

The following examples are intended to illustrate the present invention, however these examples are not to be construed to limit the scope of the invention.

Preparation of cathode active material (LiSn$_{x/2}$Mn$_{2-x}$O$_4$)

Comparative Example 1

Preparation of LiMn$_2$O$_4$ cathode active material (x=0)

Li$_2$CO$_3$ and MnO$_2$ were mixed in a weight ratio of 19:81, the amount of Li$_2$CO$_3$ used was 10% more than needed in consideration of the loss of lithium during heat treatment, the mixture was ball-milled for 24 hours in the presence of absolute ethanol and yttria stabilized zirconia balls, dried at 120° C. for 24 hours, and the resulting mixed powder was milled (first-milling) to an average particle size of 1.0 μm using an alumina mortar, followed by calcining at 700° C. for 5 hours under an ambient condition. Two thirds of the calcined powder was milled again (second milling) to an average particle size of 1.0 μm using an alumina mortar, and mixed with a PVA (polyvinyl alcohol) binder. The mixture was uniaxially pressed under a pressure of 2 ton/cm$^2$ to form a pellet, which was combined with the remaining one third of the calcined powder (unpressed), and sintered at 1,200° C. for 2 hours under an ambient condition, to obtain a LiMn$_2$O$_4$ cathode active material.

Example 1

Preparation of LiSn$_{0.0125}$Mn$_{1.975}$O$_4$ cathode active material (x=0.025)

Using a mixture of Li$_2$CO$_3$, MnO$_2$ and SnO powders in a weight ratio of 19:80.2:0.8, the procedure of Comparative Example 1 was repeated, so as to obtain a LiSn$_{0.0125}$Mn$_{1.975}$O$_4$ cathode active material.

Example 2

Preparation of LiSn$_{0.025}$Mn$_{1.95}$O$_4$ cathode active material (x=0.05)

Using a mixture of Li$_2$CO$_3$, MnO$_2$ and SnO powders in a weight ratio of 19:79.4:1.6, the procedure of Comparative Example 1 was repeated, so as to obtain a LiSn$_{0.025}$Mn$_{1.95}$O$_4$ cathode active material.

Figure 1B:
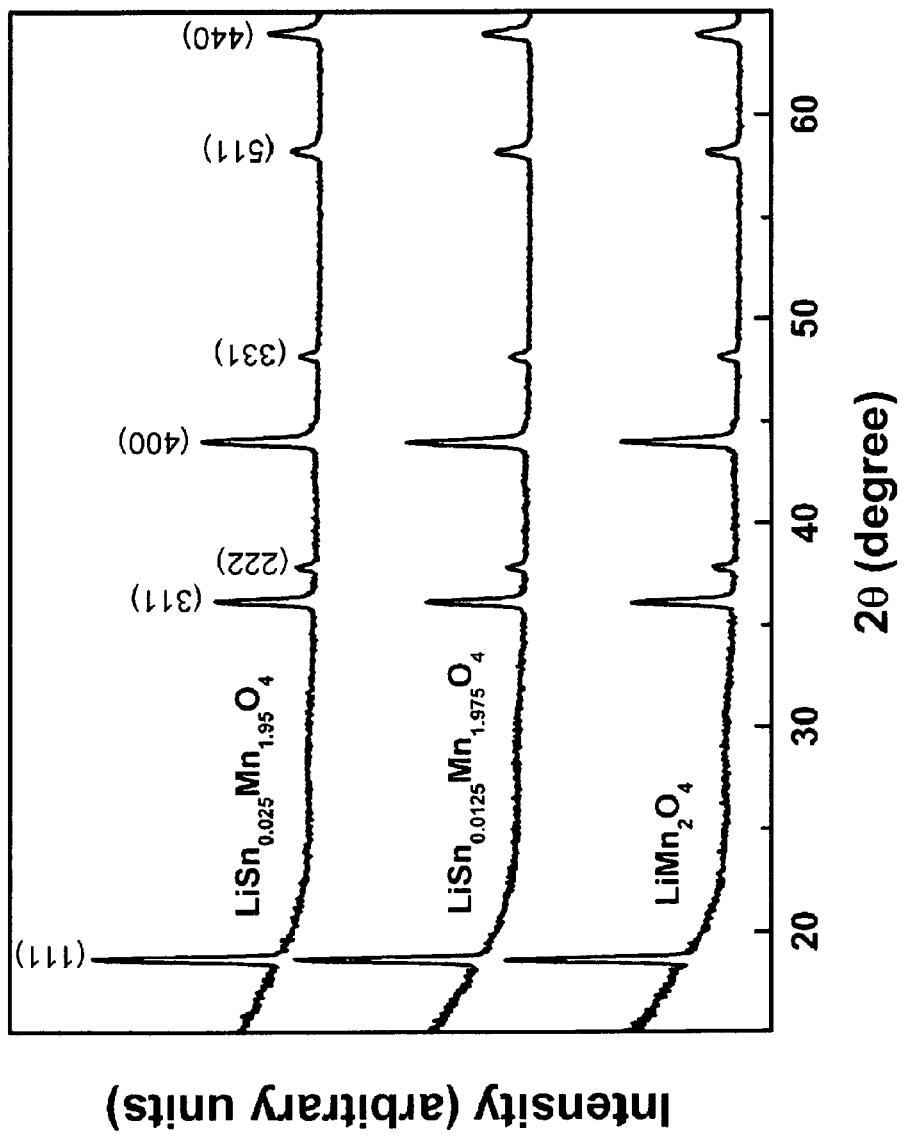
FIG. 1b: XRD patterns of the cathode active materials prepared in Comparative Example 1 and Examples 1 and 2.

XRD (X-ray diffraction) patterns of the calcined (yet not sintered) powders prepared during the procedure of Comparative Example 1 and Examples 1 and 2 were shown in FIG. 1a, in which contaminant peaks of Li$_2$MnO$_3$, γ-Mn$_2$O$_3$, SnO$_2$, etc. were detected. XRD patterns of the resulting (sintered) cathode active materials of Comparative Example 1 and Examples 1 and 2 were shown in FIG. 1b, in which the contaminants peaks were disappeared and only the peaks for the spinel structures of the desired cathode active material were shown. This means that the final sintering process made Sn ions introduced and substituted into the spinel structure.

Densities of the cathode active materials prepared in Examples 1 and 2 measured 3.5 g/cm$^3$ by using the Archimedes' method, which is 80% of the theoretical density (4.4 g/cm$^3$) and higher than the density of the conventional cathode active material of Comparative Example 1.

Preparation of cathode thin film by LCVD

The cathode active material prepared above was mounted on a target holder as a target, and a clean substrate was mounted on a substrate holder in order to conduct an LCVD (laser-assisted chemical vapor deposition) process. The distance between the substrate and the target was maintained to 4 cm, a standard pressure of a vacuum chamber was regulated to 1×10$^{-5}$ Torr or below, a substrate temperature was set to 450° C., and an oxygen pressure was adjusted to 0.2 Torr.

Using a KrF excimer laser (COMPexPro(RoHs), Coherent Inc.) with a wavelength of 248 nm, 20 ns pulse duration, a beam area of 3.5 mm$^2$, a PLD (pulsed laser deposition) power density of 3.5 J/cm$^2$, and a spot repetition of 10 Hz for 45 minutes, the cathode active material target was deposited on the substrate to obtain a cathode thin film having a thickness of 0.5 μm.

Preparation of lithium secondary cell

Using each cathode thin film prepared above as a cathode, a lithium metal as an anode, and a lithium hexafluorophosphate (LiPF$_6$) solution dissolved in an organic solvent (ethylene carbonate:diethyl carbonate=1:1, v/v) as an electrolyte, lithium secondary cells were prepared.

Figure 2A:
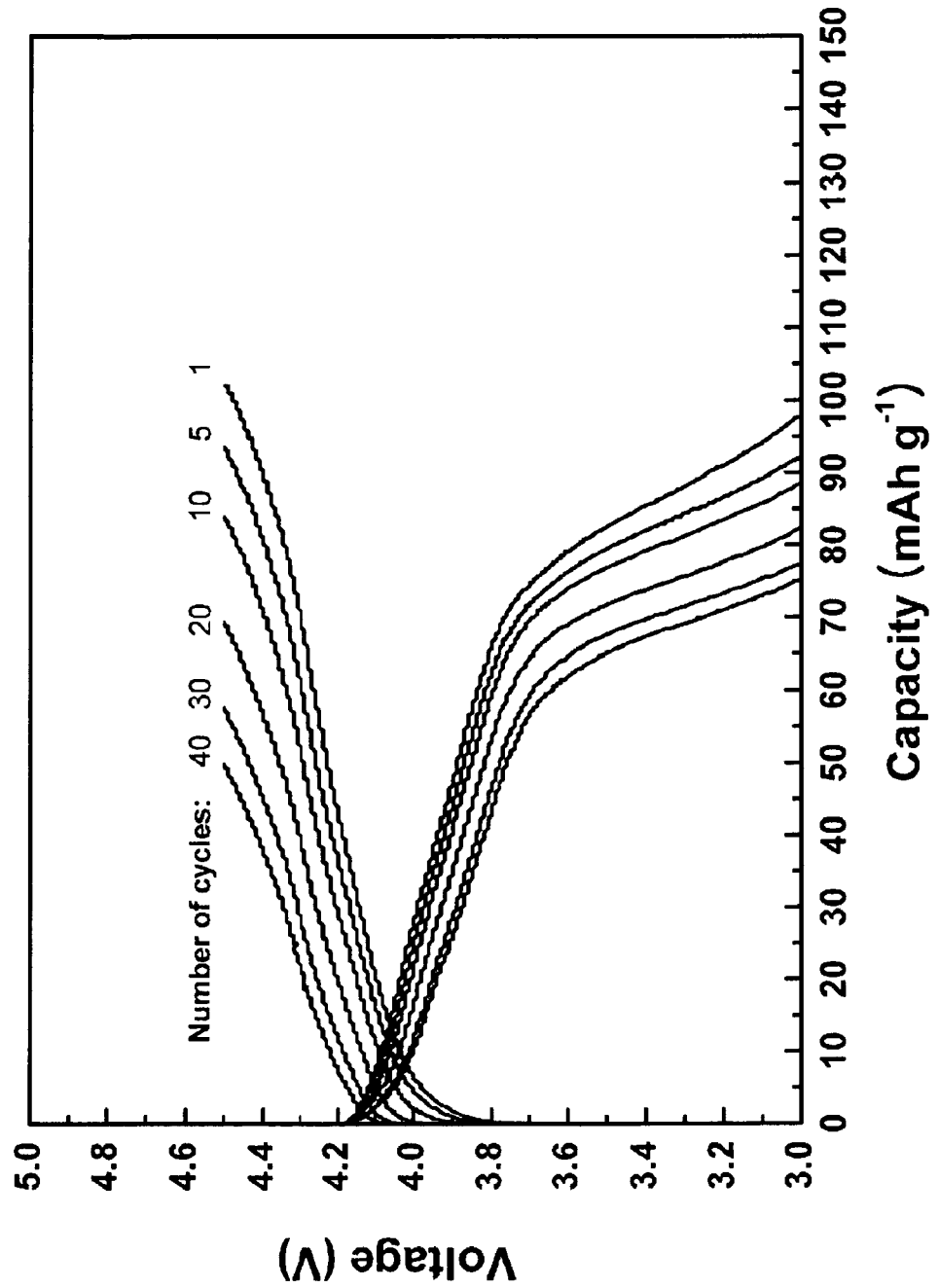
FIGS. 2a to 2c: charge/discharge properties of lithium secondary cells comprising the cathode active materials prepared in Comparative Example 1 and Examples 1 and 2, respectively.
Figure 2B:
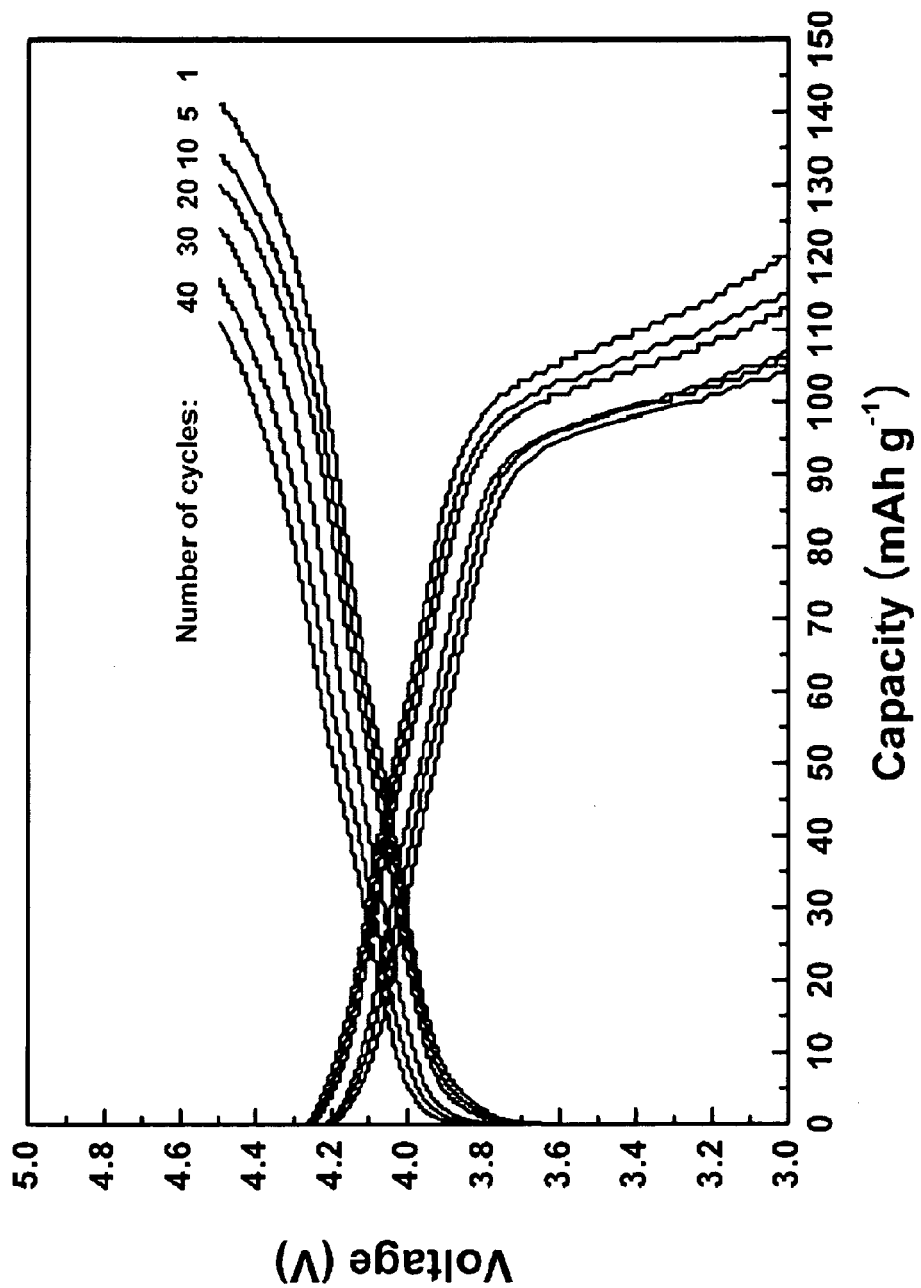
Figure 2C:
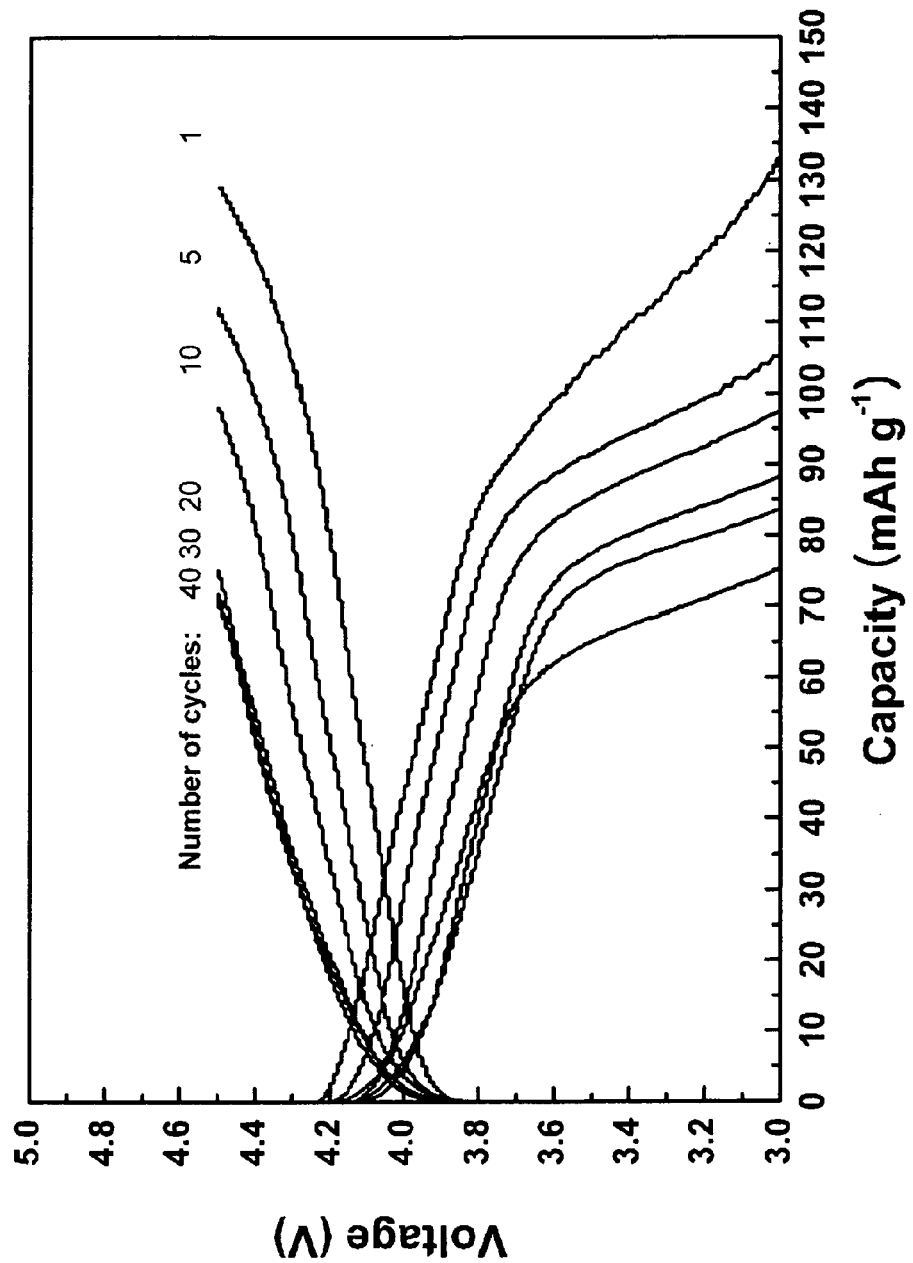

For each cell prepared above, a charge/discharge property was evaluated at a charge/discharge voltage from 3.0 to 4.5 V, which were shown in FIGS. 2a, 2b and 2c, respectively. The initial discharge capacities of the LiSn$_{x/2}$Mn$_{2-x}$O$_4$ thin films (x=0, 0.025, 0.05) measured 97.7, 120.0 and 133.0 mAh/g, which are 66, 81 and 90% of the theoretical value, respectively. As the content of a Mn$^{3+}$ ion decreases in the spinel type lithium-manganese oxide cathode, the initial charge/discharge capacity of the cell generally tends to decrease because Mn$^{3+}$ ion is one of the important factors in a cathode capacity. However, as the value x increases in the LiSn$_{x/2}$Mn$_{2-x}$O$_4$ thin film of the present invention, the initial charge/discharge capacity increased. It results from that the Mn deficient crystal structure activated an intercalation/deintercalation of lithium ions and a Sn addition increases an electronic conductivity which is a decisive factor in a cathode capacity.

Figure 3:
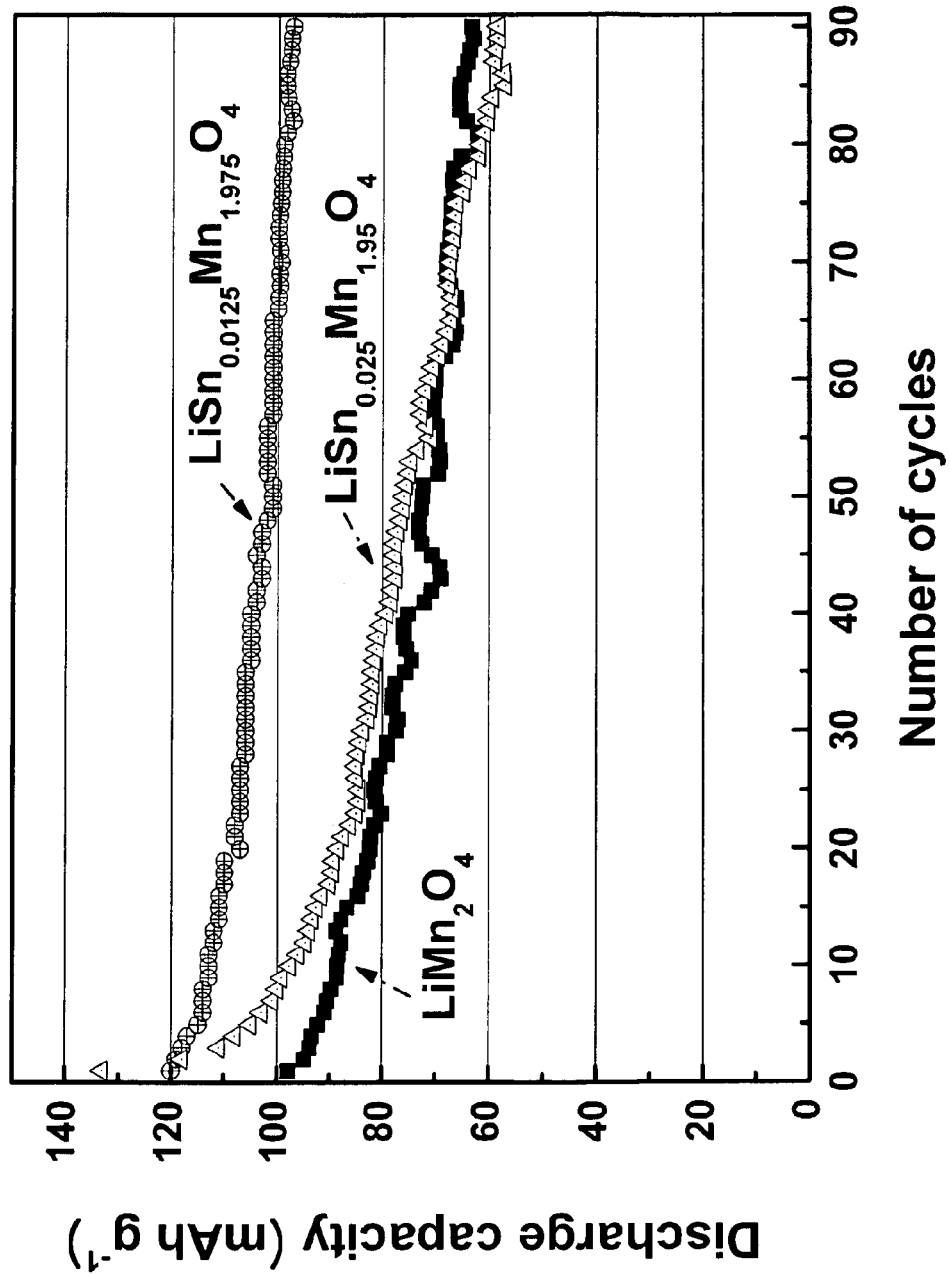
FIG. 3: cycle properties of lithium secondary cells comprising the cathode active materials prepared in Comparative Example 1 and Examples 1 and 2.

The charge/discharge capacity of each cell was evaluated at a charge/discharge voltage of 3.0 to 4.5 V with increasing a cycle number, as shown in FIG. 3. According to FIG. 3, while the $LiMn_2O_4$ cathode thin film shows an unstable cycle property, the $LiSn_{0.0125}Mn_{1.975}O_4$ cathode thin film shows much better cyclic behavior. The $LiSn_{x/2}Mn_{2-x}O_4$ cathode thin film of the present invention has a better charge/discharge property in comparison with conventional $LiMn_2O_4$-based cathode thin films prepared by substituting or doping with heterogeneous elements. Moreover, the capacity and the charge/discharge property of the inventive cathode thin films are excellent even at a high current density (4 C).

Figure 4:
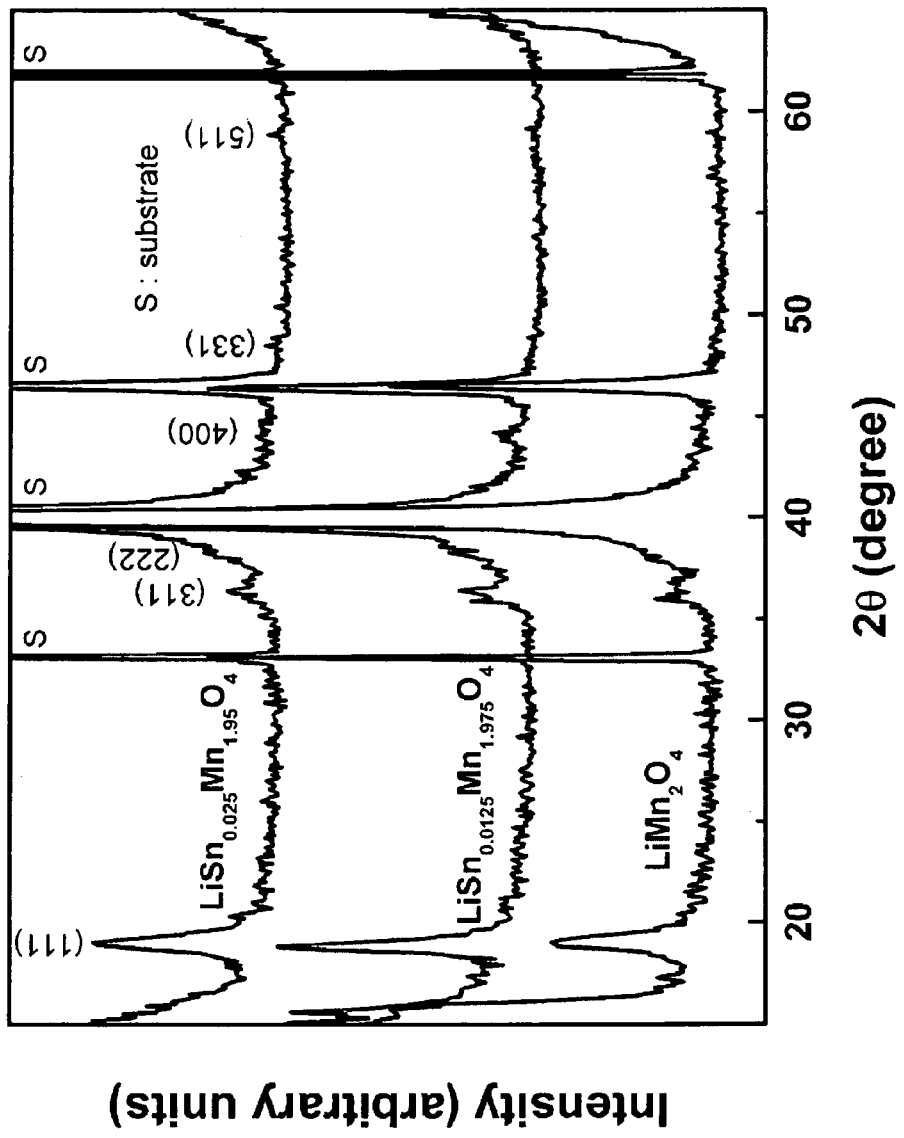
FIG. 4: XRD patterns of cathode thin films comprising the cathode active materials prepared in Comparative Example 1 and Examples 1 and 2.

XRD patterns of each thin film obtained above are shown in FIG. 4, in which all patterns show diffraction peaks (111), (311) and (400). It can be seen from FIG. 4 that Mn deficient $LiSn_{0.0125}Mn_{1.975}O_4$ and $LiSn_{0.025}Mn_{1.95}O_4$ thin films also have a spinel structure (space group Fd3m, 227).

Figure 5:
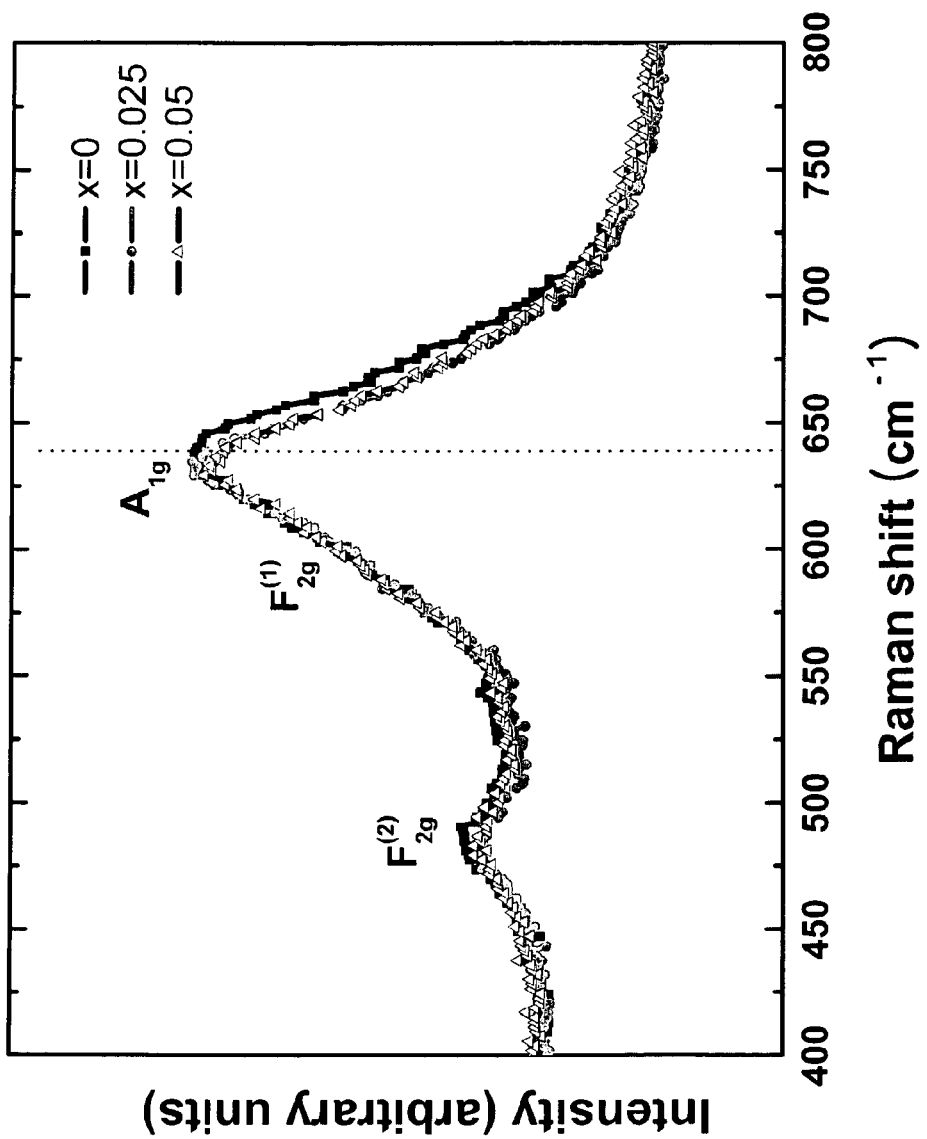
FIG. 5: Raman spectra of cathode thin films comprising the cathode active materials prepared in Comparative Example 1 and Examples 1 and 2.

Raman spectra of the cathode thin films were shown in FIG. 5. It can be seen from FIG. 5 that, as Mn is substituted with Sn, main peak $A_{1g}$ shifted to lower Raman shift in the region 630~650 $cm_{-1}$ corresponding a Mn-O stretching vibration in a spinel structure. It means that a bond length between Mn and O decreased and more lithium ions could be intercalated into an empty position in an octahedron structure during charge/discharge without a phase transition so that the spinel structure was stabilized. The fact that Raman peaks of x=0.025 and x=0.05 in FIG. 5 were almost same tells that the Sn-substituting could be effected up to x=0.05.

In the $LiSn_{x/2}Mn_{2-x}O_4$ cathode thin film (0<x<0.05) of the present invention, its Mn deficient structure can comprise more lithium ions during charge/discharge and have higher capacity in comparison with the Mn sufficient $LiM_\delta Mn_{2-\delta}O_4$ (M=metal element) and $LiMn_2O_4$ cathode thin films.

Further, the decrease of a bond length between Mn and O facilitates intercalation/deintercalation in 8a tetrahedron sites in 4 V region and expands spaces of spinel 16c octahedron sites in which lithium ions can be intercalated in 3 V region after all the available 8a sites are filled with lithium ions. Therefore, Sn-substituting in a lithium manganese oxide cathode active material can activate intercalation/deintercalation of lithium ions and improve conductivity of the material.

While the invention has been described with respect to the above specific embodiments, it should be recognized that various modifications and changes may be made to the invention by those skilled in the art which also fall within the scope of the invention as defined by the appended claims.

The invention claimed is:

1. A method of preparing the lithium-manganese-tin-oxide of formula (I):

$$LiSn_{x/2}Mn_{2-x}O_4 \qquad (I)$$

wherein, 0<x ≤0.05, the method comprising the steps of:
a) mixing powders of Li, Mn and Sn compounds to obtain a mixed powder, wherein the amounts of the Li, Mn, and Sn compounds mixed together comprise 18.0 to 26.0 wt%, 72.4 to 81.9 wt%, and 0.1 to 1.6 wt%, respectively, based on the total weight of the mixed powder, and the Sn compound is selected from the group consisting of SnO, $Sn(CH_3CO_2)_2$, $SnCl_2$, $SnCl_2·2H_2O$, $[CH_3(CH_2)_3CH(C_2H_5)CO_2]_2Sn$, $SnF_2$, $Sn_2CO_4$, $SnSO_4$, $SnS$, and a mixture thereof;
b) first-milling the mixed powder;
c) calcining the first-milled powder;
d) second-milling the calcined powder;
e) pressing the second-milled powder; and
f) sintering the pressed mixture.

2. The method of claim 1, wherein the Li compound is selected from the group consisting of $Li_2CO3$, $LiOH$, $CH_3COCH=C(OLi)CH_3$, $LiOOCCH_3$, $LiOOCCH_3·2H_2O$, $LiCl$, $LiCl·xH_2O$ (0.005≤x≤1), $LiO_2CCH_2C(OH)(CO_2Li)CH_2CO_2Li·xH_2O$ (1≤x≤6), $Li_2S$, $Li_2SO_4·H^2O$, and a mixture thereof.

3. The method of claim 1, wherein the Mn compound is selected from the group consisting of $MnO_2$, $(CH_3CO_2)_2Mn$, $(CH_3COO)_2Mn·4H_2O$, $(CH_3COO)_2Mn·2H_2O$, $[CH_3COCH=C(O)CH_3]_2Mn$, $Mn(C_5H_7O_2)_3$, $MnCO_3$, $MnCl_2$, $MnCl_2·xH_2O$ (1≤x≤5), $[C_6H_{11}(CH_2)_3CO_2]_2Mn$, $MnF_2$, $Mn(NO_3)_2$, $Mn_3O_4$, $MnO$, $Mn_2O_3$, $Mn(ClO_4)_2·6·H_2O$, $MnSO_4·xH_2O$ (1≤x≤6), $MnS$, and a mixture thereof.

4. The method of claim 1, wherein the calcination process in step c) is conducted at 400 to 800° C. for 1 to 5 hours under an ambient condition.

5. The method of claim 1, wherein the second-milled powder is pressed in step e) to form a pellet.

6. The method of claim 1, wherein the sintering process in step f) is conducted at 800 to 1,300° C. for 1 to 24 hours under an ambient condition.

7. A method for preparing a cathode thin film of a lithium-manganese-tin-oxide for a secondary cell that comprises formula (I):

$$LiSn_{x/2}Mn_{2-x}O_4 \qquad (I)$$

wherein, 0<x≤0.05, the method comprising the steps of:
a) mixing powders of Li, Mn, and Sn compounds to obtain a mixed powder, wherein the amounts of the Li, Mn, and Sn compounds mixed together comprise 18.0 to 26.0 wt%, 72.4 to 81.9 wt%, and 0.1 to 1.6 wt%, respectively, based on the total weight of the mixed powder, and the Sn compound is selected from the group consisting of SnO, $Sn(CH_3CO_2)_2$, $SnCl_2$, $SnCl_2·2H_2O$, $[CH_3(CH_2)_3CH(C_2H_5)CO_2]_2Sn$, $SnF_2$, $Sn_2CO_4$, $SnSO_4$, $SnS$, and a mixture thereof;
b) first-milling the mixed powder;
c) calcining the first-milled powder;
d) second-milling the calcined powder;
e) pressing the second milled powder;
f) sintering the pressed mixture to form a target; and
g) depositing the target on a substrate using an LCVD (laser-assisted chemical vapor deposition) process.

8. The method of claim 7, wherein the LCVD process is conducted at a substrate temperature of 350 to 550° C., while maintaining the distance between the substrate and the target at 3 to 5 cm and the oxygen partial pressure at 0.05 to 0.25 Torr.

9. The method of claim 7, wherein the LCVD process is conducted with a laser power density of 1 to 4 $J/cm^2$, a beam area of 2 to 5 $mm^2$ and a spot repetition of 3 to 10Hz, for 30 to 120 minutes.

* * * * *